(12) United States Patent
Light et al.

(10) Patent No.: US 10,018,057 B2
(45) Date of Patent: Jul. 10, 2018

(54) METHOD OF MOUNTING A TURBINE WHEEL AXIAL RETENTION DEVICE

(71) Applicant: United Technologies Corporation, Hartford, CT (US)

(72) Inventors: Stacey H. Light, San Diego, CA (US); Behzad Hagshenas, San Diego, CA (US)

(73) Assignee: United Technologies Corporation, Farmington, CT (US)

( * ) Notice: Subject to any disclaimer, the term of this patent is extended or adjusted under 35 U.S.C. 154(b) by 592 days.

(21) Appl. No.: 14/618,662

(22) Filed: Feb. 10, 2015

(65) Prior Publication Data
US 2016/0230571 A1    Aug. 11, 2016

(51) Int. Cl.
| | | |
|---|---|---|
| *F01D 5/30* | (2006.01) | |
| *F01D 25/30* | (2006.01) | |
| *F01D 25/24* | (2006.01) | |
| *F01D 25/16* | (2006.01) | |
| *F01D 21/04* | (2006.01) | |
| *F02K 1/04* | (2006.01) | |

(52) U.S. Cl.
CPC ............. *F01D 5/30* (2013.01); *F01D 21/045* (2013.01); *F01D 25/162* (2013.01); *F01D 25/243* (2013.01); *F01D 25/246* (2013.01); *F01D 25/30* (2013.01); *F02K 1/04* (2013.01); *F05D 2220/50* (2013.01); *F05D 2250/15* (2013.01); *Y02T 50/671* (2013.01)

(58) Field of Classification Search
CPC ...... F01D 25/28; F01D 25/243; F01D 25/246; F01D 9/044; F01D 9/045; F01D 9/048; F01D 5/02; F01D 25/162; F01D 25/30; F01D 21/04; F01D 21/045; Y02T 50/671; F05D 2230/10; F05D 2230/60; F05D 2230/232; F05D 2300/177; F05D 2300/31; F05D 2300/175; F05D 2260/30; F05D 2240/24; F05D 2220/30
See application file for complete search history.

(56) References Cited

U.S. PATENT DOCUMENTS

| | | | | |
|---|---|---|---|---|
| 2,938,336 A | * | 5/1960 | Peterson | ................ F01D 9/065 60/39.5 |
| 3,330,475 A | * | 7/1967 | Dennison | ................ F01D 5/022 415/194 |
| 4,431,373 A | * | 2/1984 | Monsarrat | ............. F01D 25/246 415/1 |
| 4,668,134 A | * | 5/1987 | Vindez | ................. B23B 49/023 408/130 |

(Continued)

OTHER PUBLICATIONS

Extended European Search Report dated Jul. 8, 2016 in European Application No. 16155064.5.

*Primary Examiner* — Ian Paquette
(74) *Attorney, Agent, or Firm* — Snell & Wilmer L.L.P.

(57) ABSTRACT

A technique for mounting a turbine retention device is provided. The technique comprises forming openings in a diffuser, aligning a mounting bracket with the openings, and installing fasteners through the openings and the mounting bracket. A turbine retention device mounted to a diffuser may is also provided. The turbine retention device may comprise a bullet, wings coupled to the bullet, mounting brackets coupled to the wings, and fasteners disposed through the mounting brackets and openings formed in the diffuser.

19 Claims, 14 Drawing Sheets

(56) References Cited

U.S. PATENT DOCUMENTS

2010/0221115 A1  9/2010  Jardine et al.
2014/0003911 A1  1/2014  Alexander et al.
2014/0165590 A1  6/2014  Jewess et al.
2015/0285100 A1* 10/2015  Sultana .................... F02K 1/04
                                                248/74.1

* cited by examiner

METHOD OF MOUNTING A TURBINE WHEEL AXIAL RETENTION DEVICE

FIELD OF INVENTION

The present disclosure relates to radial turbine engines, and, more specifically, to a turbine wheel retention device and method of mounting the same.

BACKGROUND

Radial turbine engines, for example an auxiliary power unit (APU) in an aircraft, may be equipped with a turbine wheel. If a turbine wheel from radial turbine engine liberates from the APU, the wheel may pass outside containment features of the APU. As the wheel moves further aft in the engine, the potential for radial ejection increases. In that regard, an APU with a turbine wheel may pose a loss threat in the event the turbine wheel is freed. In addition, weight is a concern for aircraft components. Additional weight may result in reduced efficiency. Manufacturing techniques that result in a lower strength product may rely on greater material thickness to provide a desired strength. Thus, manufacturing techniques that yield lower strengths may result in greater weight.

SUMMARY

A method of mounting a turbine retention device comprises forming openings in a diffuser, aligning a mounting bracket with the openings, and installing fasteners through the openings and the mounting bracket.

In various embodiments, the method may further comprise the steps of forming sets of openings equally spaced about the diffuser, placing a drill fixture on the diffuser, drilling the openings through the drill fixture, and/or clocking the drill fixture to align the drill fixture. The fasteners may comprise bolts. The fasteners may comprise rivets. The method may further include placing spacers between the fasteners and the diffuser. The openings may be formed in the diffuser while the diffuser is installed on an aircraft.

A method of installing a turbine retention device in a radial turbine engine may comprise forming openings in a diffuser, aligning a mounting bracket of the turbine retention device with the openings, and installing fasteners through the openings and the mounting bracket.

In various embodiments, the method may also include forming sets of openings equally spaced about the diffuser, placing a drill fixture on the diffuser, drilling the openings through the drill fixture, and/or clocking the drill fixture to align the drill fixture. The fasteners may comprise bolts. The fasteners may comprise rivets. Spacers may be placed between the fasteners and the diffuser. The openings may be formed while the radial turbine engine is installed on an aircraft.

A turbine retention device mounted to a diffuser may comprise a bullet, wings coupled to the bullet, mounting brackets coupled to the wings, and fasteners disposed through the mounting brackets and openings formed in the diffuser.

In various embodiments, the wings may meet the bullet at a substantially tangential angle. The fasteners may comprise at least one of rivets or bolts. The openings may be formed in the diffuser in pairs.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
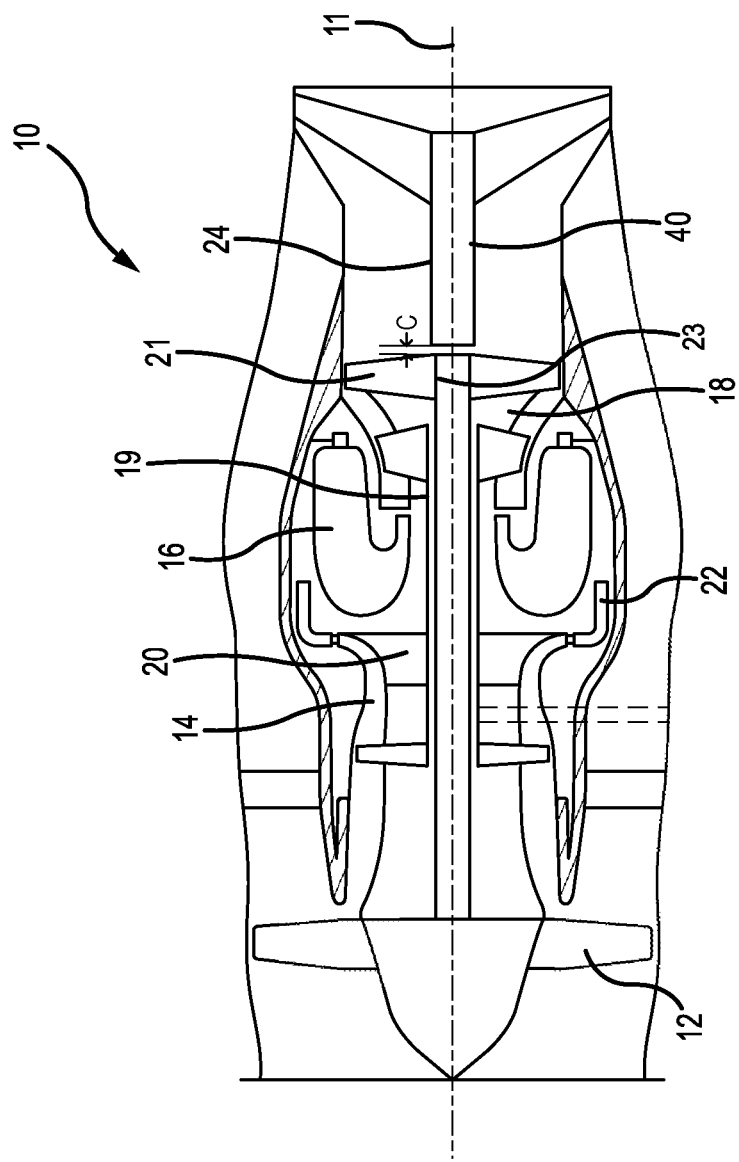
FIG. 1 illustrates an exemplary radial turbine engine, in accordance with various embodiments.

With reference to FIG. 1, a radial turbine engine 10 comprising a retention device 24 is shown, in accordance with various embodiments. Radial turbine engine 10 may comprise a fan 12 through which ambient air is propelled and a centrifugal compressor 14 for pressurizing the air. A combustor 16 may be disposed aft of centrifugal compressor 14 (also referred to herein as an impeller). The compressed air is mixed with fuel and ignited in the combustor, generating an annular stream of hot combustion gases. A turbine 18 is aft of the combustor 16 and is also mechanically coupled to centrifugal compressor 14 through shaft 19. Turbine 18 extracts energy from the combusted gases exiting combustor 16. In various embodiments, one or more of the previous components, such as fan 12, may not be present. Retention device 24 may be disposed aft of turbine 18 and in the exhaust path of the engine. The clearance C between the hub 23 of rotor 21 and center bullet 40 of retention device 24 may be approximately 0.080 inches to 0.12 inches (0.2 cm to 0.3 cm) to retain a lose turbine wheel. In that regard, the axial travel distance of a turbine wheel may be limited and the turbine wheel retained in substantially the same position (i.e., the distance a turbine wheel may shift is limited by the clearance distance).

Various components of radial turbine engine 10 may rotate about axis of rotation 11. The centrifugal compressor 14 may comprise centrifugal impeller 20 which directs the pressurized air into diffuser vanes 22. The forward and aft positions of radial turbine engine 10 may be described relatively along axis of rotation 11. For example, fan 12 may be referred to as forward of turbine 18 and turbine 18 may be referred to as aft of fan 12. As air flows from fan 12 to the more aft components of radial turbine engine 10, axis of rotation 11 may also generally define the net direction of the air stream flow. However, the direction of the air stream flow may vary through the individual components. For example, the air flow may be radial in an exducer section of centrifugal impeller 20. The present disclosure is applicable to other types of turbine engines, such as auxiliary power units, turbo-shaft units, turbo jet units, and turbo-prop units.

Figure 2A:
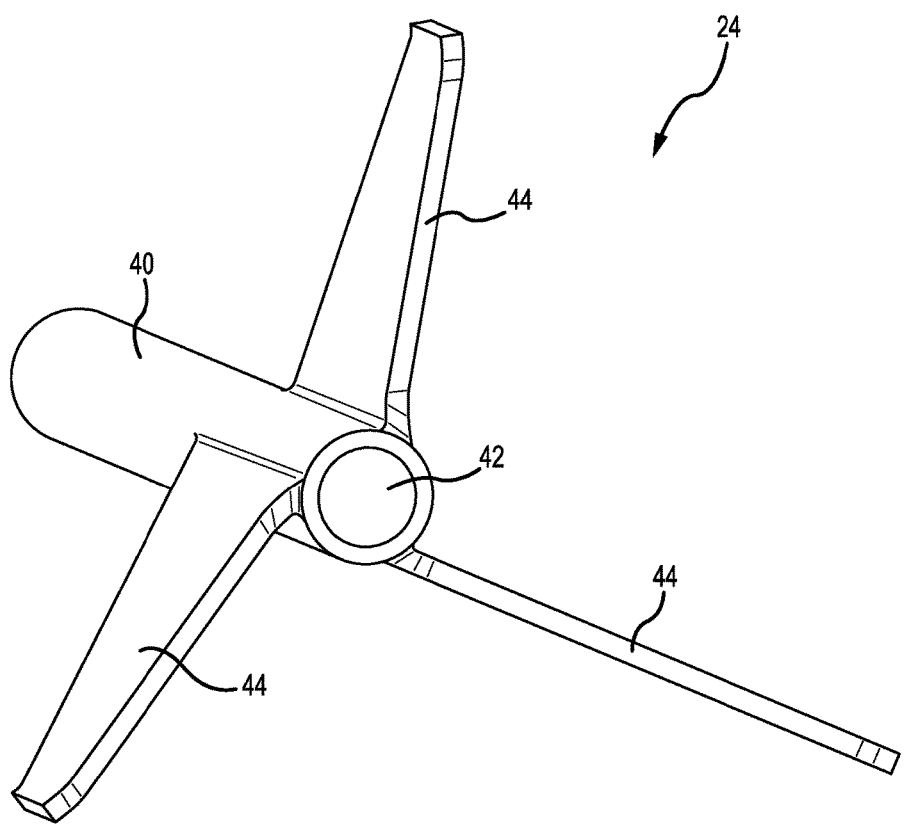
FIG. 2A illustrates a perspective view of a bullet of a rotor retention device coupled to wings of the rotor retention device, in accordance with various embodiments.
Figure 2B:
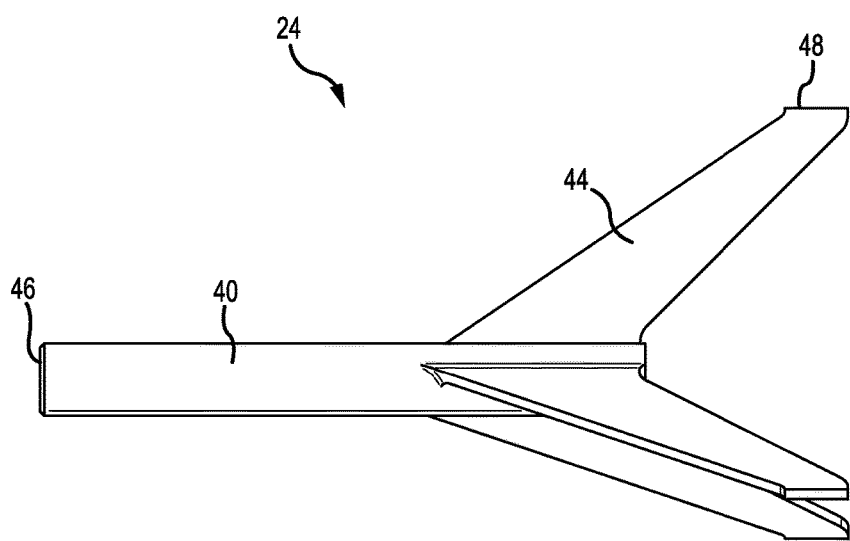
FIG. 2B illustrates an elevation view of a bullet of a rotor retention device coupled to wings of the rotor retention device, in accordance with various embodiments.

With reference to FIGS. 2A and 2B, a center bullet 40 and wings 44 of a retention device 24 is shown, in accordance with various embodiments. The center bullet 40 is hollow with center bullet 40 defining internal cavity 42 to reduce the weight of the center bullet. Center bullet 40 may be made from a solid piece of metal (i.e., bar stock) and bored out, or center bullet 40 may be made from a hollow metal tube. A cap 46 may be formed integral with center bullet 40 or may be welded on to center bullet 40. Cap 46 may provide a solid surface to prevent exhaust from flowing through center bullet 40. Center bullet 40 may have a cylindrical shape with a diameter of center bullet 40 selected relative to a diameter of an adjacent wheel hub. For example, center bullet 40 may have a diameter in the range of 80% to 120% of the diameter of an adjacent turbine wheel hub. In that regard, cap 46 and center bullet 40 may minimize a distance in the aft direction that a loose turbine wheel may travel.

In various embodiments, the lengths of wings 44 may be substantially equal, with the wings circumferentially spaced apart from one another. The wings may be spaced at unequal distances about center bullet 40, but equal distances between wings 44 may tend to distribute the load on retention device 24 more evenly than unequal distances. Three or more wings may provide accurate locating of the center bullet 40 in a configuration that tends to reduce blockage for exhaust flow and tends to reduce weight. Wings 44 may comprise a mating surface 48 at a distal end from the cylindrical body of center bullet 40. Wings 44 may be coupled to center bullet 40 by welding or other suitable metal joining technique, or wings 44 may be formed integrally with center bullet 40. The shape of wings 44 may be selected to minimize vibrations. For example, wings 44 may be shaped so that retention device 24 does not have resonant frequencies near the operating frequencies of the engine. As illustrated, wings 44 may have a triangular shape with the joint at center bullet 40 have a longer axial length than mating surface 48 to limit vibration during use.

In various embodiments, the wings may meet the bullet at a substantially tangential angle (i.e., wings 44 may lie on a non-radial plane with respect to the cylindrical body of center bullet 40). If center bullet 40 is welded to wings 44, the wings may be at an angle from center bullet 40 that is non-radial to provide a strong joint between wings 44 and center bullet 40. The plane of wings 44 may be at an angle relative to the axis of rotation 11 of radial turbine engine 10 (of FIG. 1). In that regard, wings 44 may have a minimal impact on the sound signature of the engine. The angle of the wings may be selected to minimize the difference between the flow angle of air in an exhaust of turbine 18 (of FIG. 1), which may be spinning as it reaches wings 44 of retention device 24.

Figure 3A:
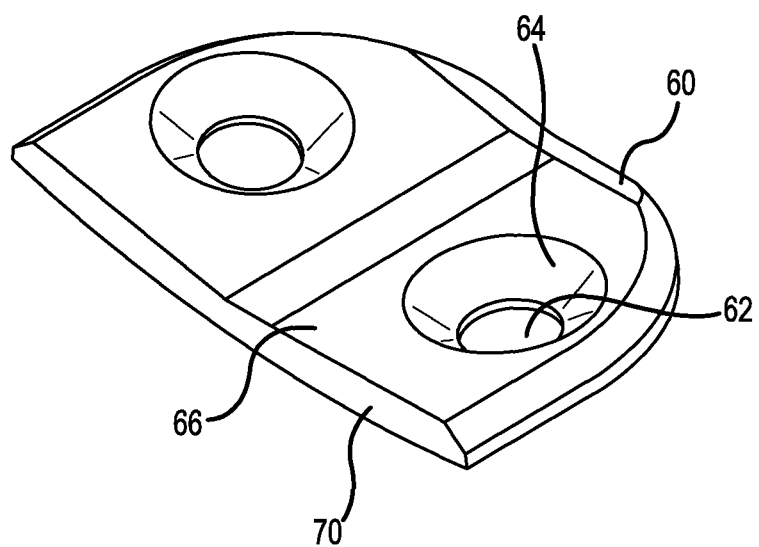
FIG. 3A illustrates a mounting bracket for a rotor retention device, in accordance with various embodiments.
Figure 3B:
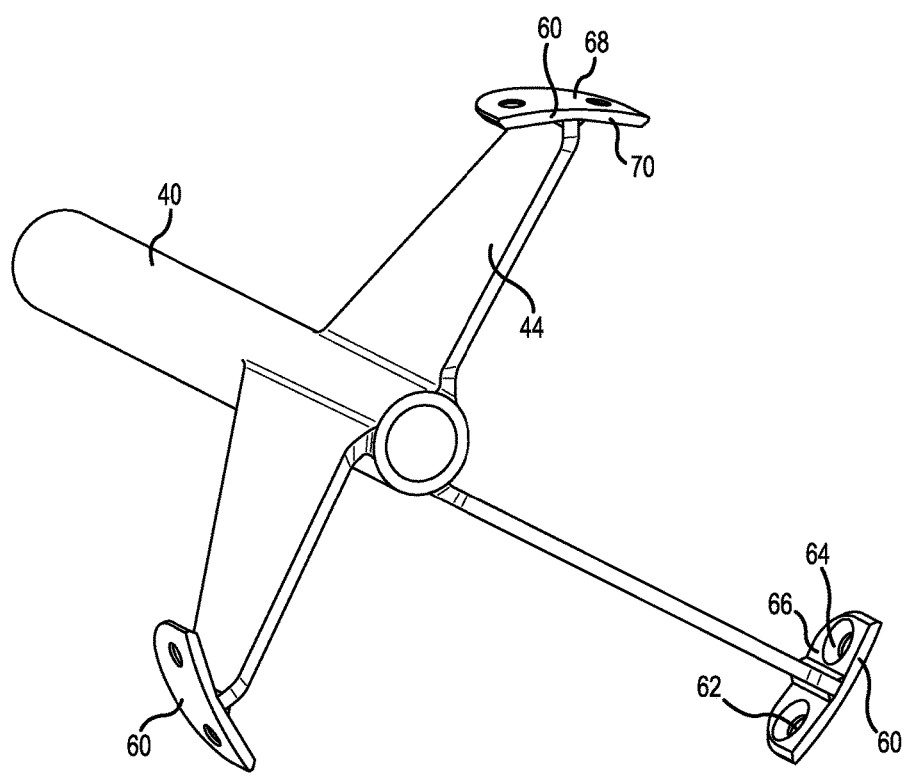
FIG. 3B illustrates mounting brackets coupled to wings of a rotor retention device, in accordance with various embodiments.

With reference to FIGS. 3A and 3B, a mounting bracket 60 is shown coupled to wings 44, in accordance with various embodiments. Mounting bracket 60 may comprise one or more openings 62. Mounting bracket 60 may be a pad with countersunk sidewalls 64 of openings 62 shaped to match a contour of a later-installed fastener. Countersunk sidewalls 64 may reduce and/or eliminate the protrusion of a fastener used in conjunction with mounting bracket 60. Inner surface 66 of mounting bracket 60 may be configured to weld to wings 44. An aft surface 70 of mounting bracket 60 may face in an aft direction in response to mounting bracket 60 being welded or otherwise coupled to wing 44. Wing 44 may be coupled to inner surface 66 while outer surface 68 faces away from wing 44 when mounted. A forward edge of mounting bracket may be angled or otherwise aerodynamically shaped to reduce drag on exhaust gases. Mounting bracket 60 may be made from, for example, an austenitic nickel-chromium-based alloy or other materials capable of withstanding exhaust temperatures.

With reference to FIGS. 4A through 4D, retention device 24 is shown mounted to a diffuser and/or to piece of sheet metal. Mounting brackets 60 may be mounted to diffuser 80 by fasteners such as rivets or bolts. In that regard, fasteners may extend through openings machined through diffuser 80. For example, rivet head 86 may rest in mounting bracket 60 and extend through mounting bracket 60, diffuser 80, spacer 84, and to a tail end 82 of the rivet. An aft surface 70 of mounting bracket 60 may be flush with aft surface 83 of diffuser 80 or diffuser 80 may overhang mounting bracket 60.

Figure 4A:
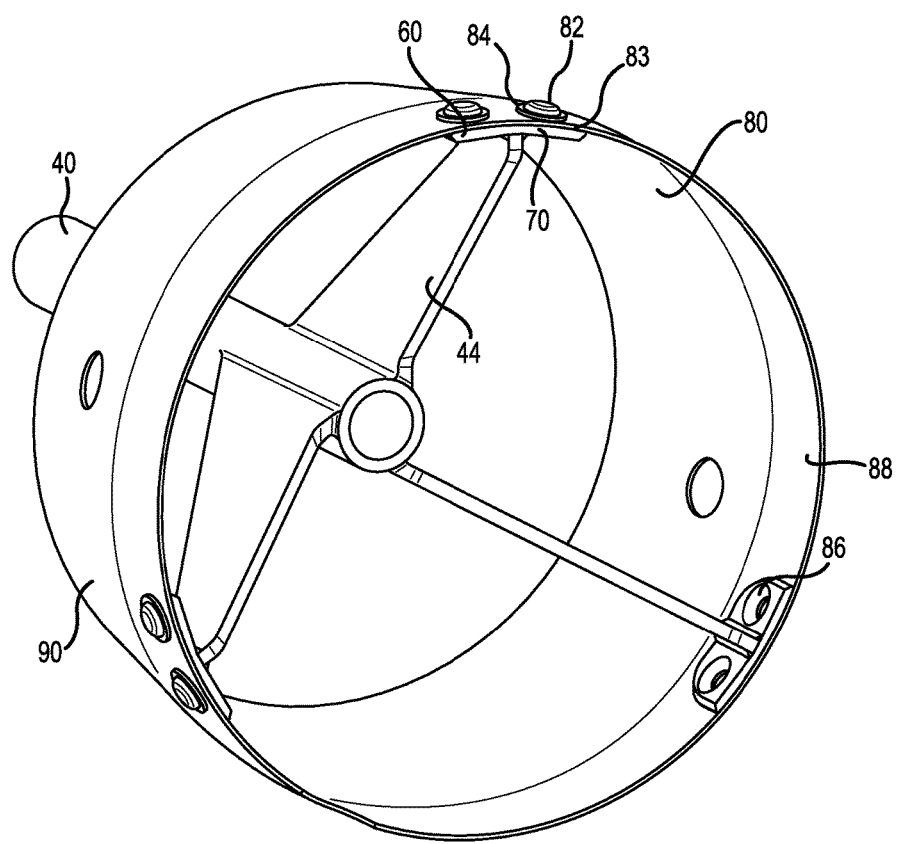
FIG. 4A illustrates a rotor retention device fastened to a diffuser, in accordance with various embodiments.
Figure 4B:
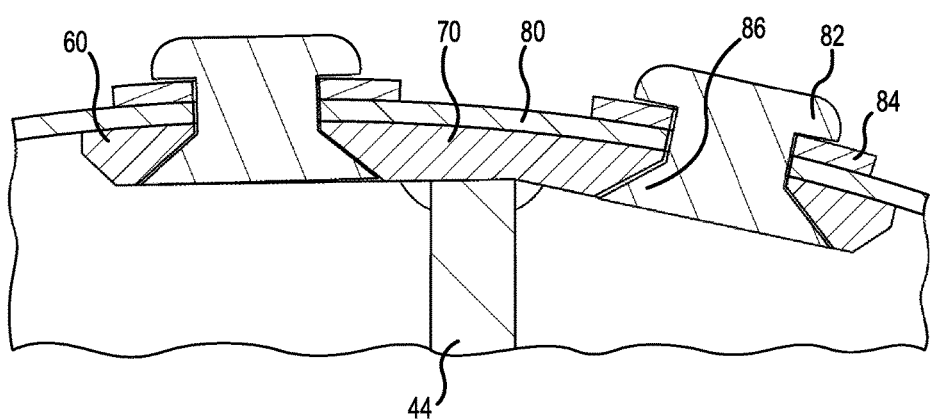
FIG. 4B illustrates a cross sectional view of a mounting bracket fastened to a diffuser, in accordance with various embodiments.
Figure 4C:
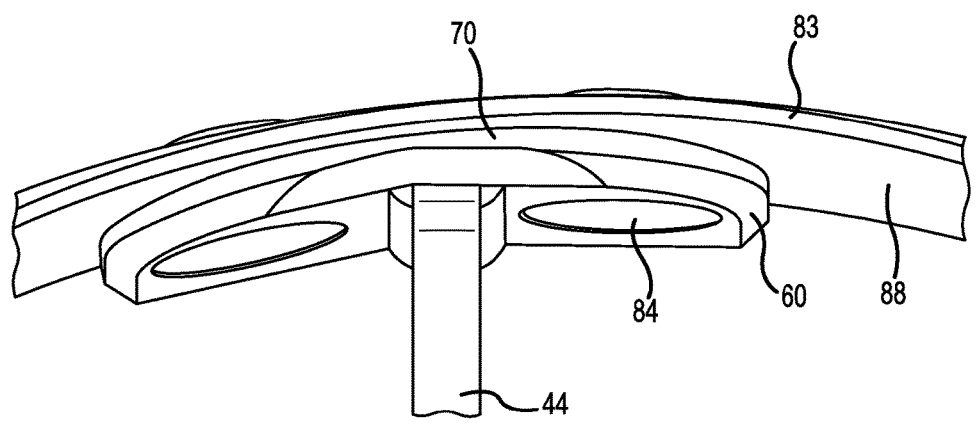
FIG. 4C illustrates a mounting bracket mounted to a diffuser case, in accordance with various embodiments.
Figure 4D:
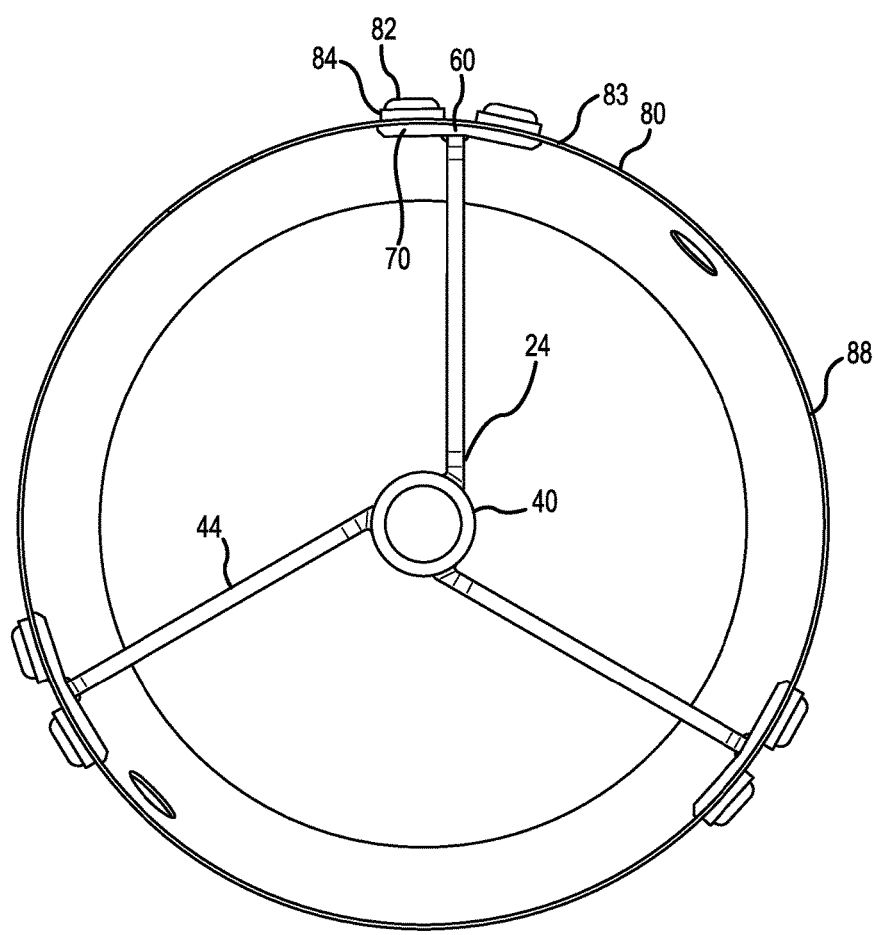
FIG. 4D illustrates a retention device mounted to a diffuser and viewed from aft to forward, in accordance with various embodiments.

In various embodiments, aft surface 83 of diffuser 80 may extend further aft than mounting bracket 60 or mounting bracket 60 may be flush with aft surface 83. As illustrated in FIG. 4D, wings 44 may be tangentially orientated relative to center bullet 40. Similarly, the spacing of wings 44 circumferentially about center bullet 40 may be substantially equal. Wings 44 may each comprise the same length to locate center bullet 40 centrally to the cylindrical walls of diffuser 80. Internal surface 88 may face radially inward towards wings 44 and bullet 40, and outer surface 90 may face radially outward.

In various embodiments, center bullet 40 and wings 44 may be formed as an integral unit using additive manufacturing techniques. For example, center bullet 40 and wings 44 may be formed by at least one of direct metal laser sintering, selective laser sintering, selective laser melting, electron-beam melting, or electron-beam freeform fabrication. Forming the components of retention device 24 may also include the steps of forming a core of the component wall using additive manufacturing or other techniques and casting the component. A mold may be formed as one piece with the core using additive manufacturing. Center bullet 40 and wings 44 may also be formed using a machining process. For example, a wrought piece of metal may be turned to form center bullet 40 and/or wings 44. Additive manufacturing and/or machining wrought metals may yield higher strength, lighter weight components than casting. In various embodiments, center bullet 40, and wing 44 may be made from, for example, an austenitic nickel-chromium-based alloy, or other materials capable of withstanding exhaust temperatures.

Figure 5A:
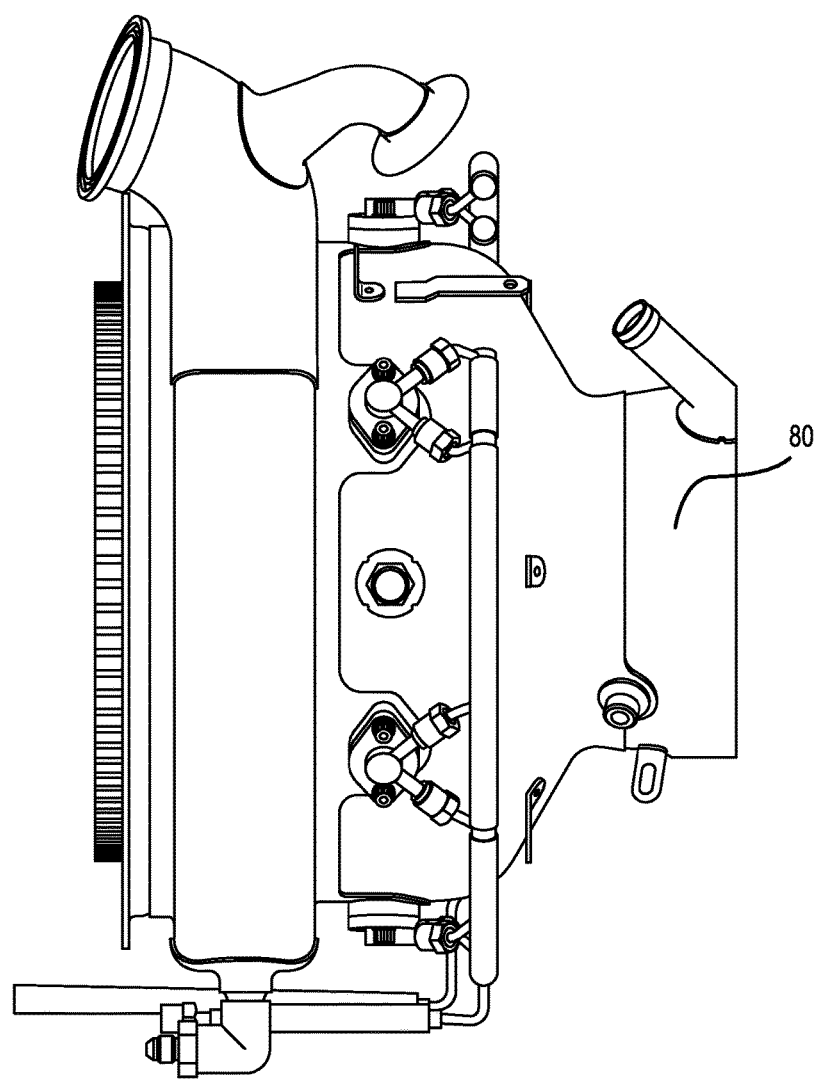
FIG. 5A illustrates an exemplary diffuser of a radial turbine engine, in accordance with various embodiments.
Figure 5B:
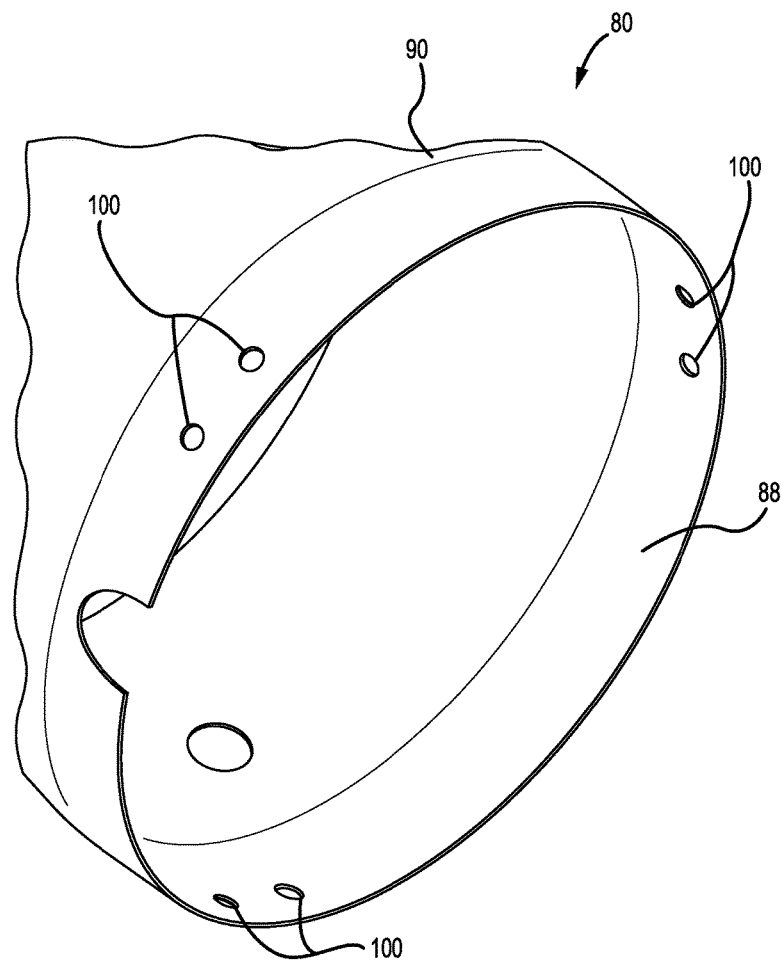
FIG. 5B illustrates openings machined into a diffuser, in accordance with various embodiments.

With reference to FIGS. 5A through 5E, a method of mounting a retention device in a radial turbine engine is shown, in accordance with various embodiments. In FIG. 5A, a detailed view of diffuser 80 is shown, according to various embodiments. Diffuser 80 is positioned aft of, and radially outward from, rotor 21 as illustrated in FIG. 1. Diffuser 80 may guide an exhaust stream exiting a turbine out of the engine. With reference to FIG. 5B, fastener holes 100 are formed through diffuser 80. Fastener holes 100 may be formed using a drill and a drill fixture to align drill openings with respect to one another. The drill fixture may also include a clocking mechanism to align fastener holes 100 relative to other features situated nearby on diffuser 80. Fastener openings may be drilled from internal surface 88 or outer surface 90 of diffuser 80. Fastener holes 100 may be formed through diffuser 80 while diffuser 80 is mounted on an aircraft. In that regard, retention device 24 (of FIG. 5D) may be mounted to diffuser 80 on an aircraft in the field through the use of fasteners. Retention device 24 mounted to diffuser 80 on-wing may enable efficient retrofitting on existing radial turbine engines.

Figure 5C:
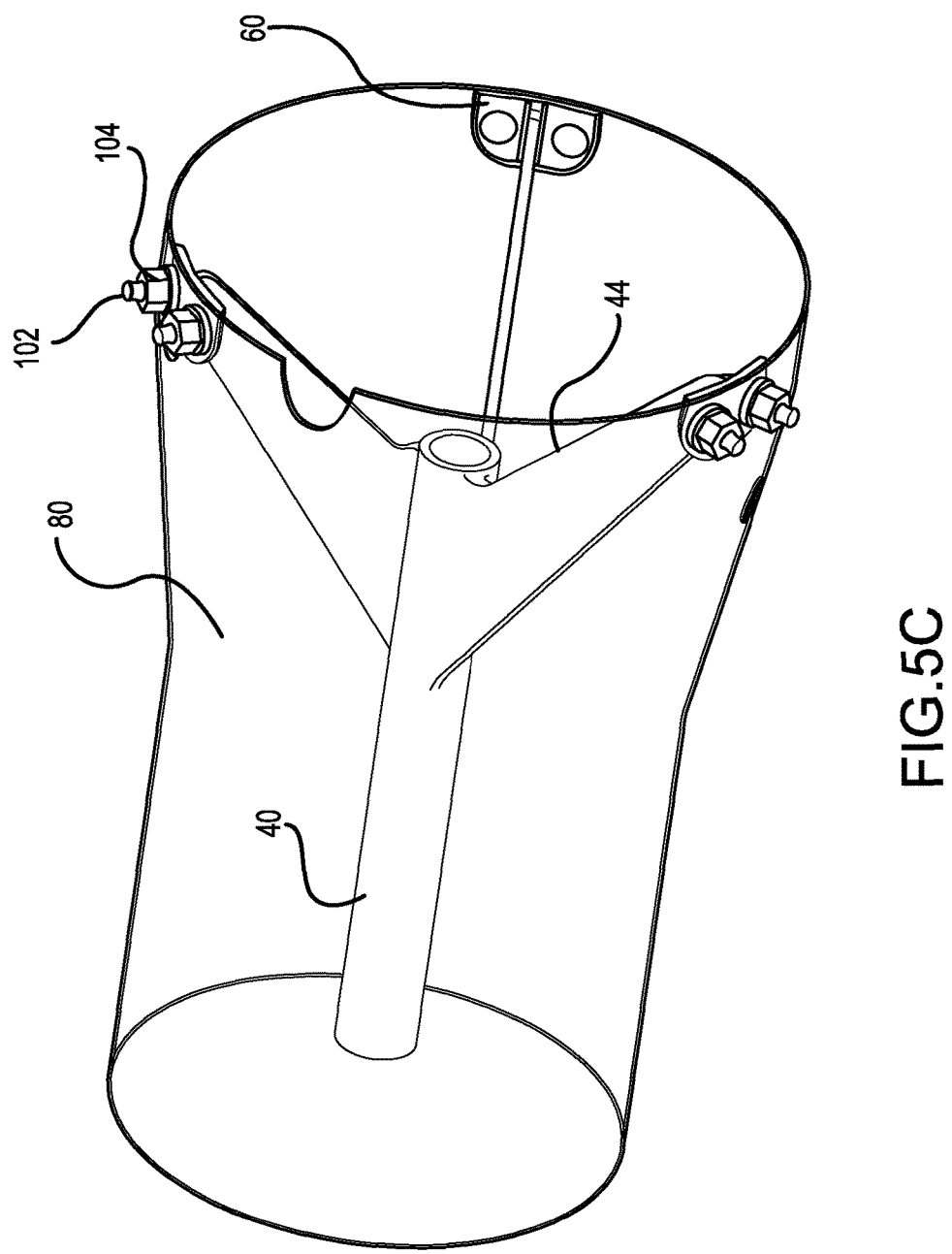
FIG. 5C illustrates a perspective view of a diffuser with a retention device mounted to the diffuser, in accordance with various embodiments.
Figure 5D:
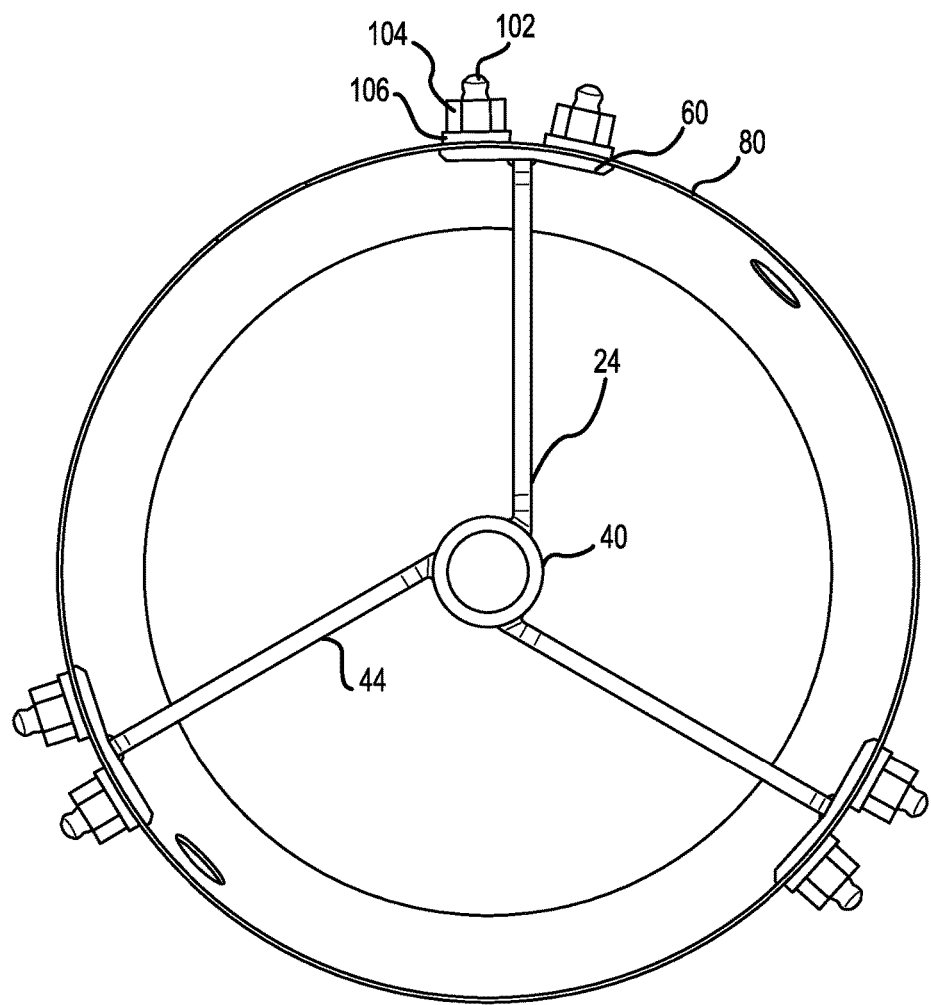
FIG. 5D illustrates a cylindrical diffuser with a retention device mounted central to the diffuser from aft looking forward, in accordance with various embodiments.
Figure 5E:
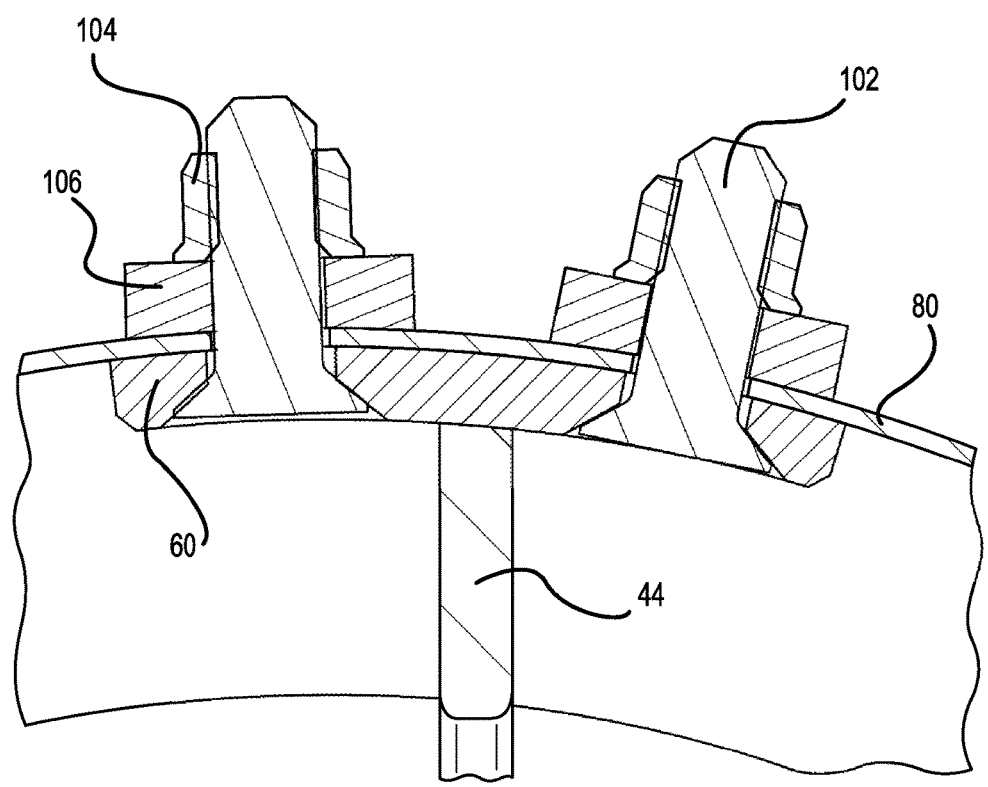
FIG. 5E illustrates exemplary hardware used to fasten a retention device to a diffuser, in accordance with various embodiments.

With reference to FIGS. 5C-5E, retention device 24 is shown mounted to diffuser 80. Fasteners (such as the rivets of FIG. 4B or bolts of FIG. 5E) may be used to secure retention device 24 to diffuser 80. Bolts 102 may be inserted through mounting bracket 60 and fastener holes 100 (of FIG. 5B) of diffuser 80 to secure retention device 24 within diffuser 80. Bolt 102 may have a head resting at least partially within mounting bracket 60 with a threaded portion extending through diffuser 80. Bolt 102 may be made from a high-performance nickel alloy. Bolt 102 may further be silver plated to provide lubrication and corrosion deterrence. A spacer 106 may rest between diffuser 80 and nut 104. Spacer 106 and nut 104 may also be made from a high-performance nickel alloy. Nut 104 may be tightened on diffuser so that any excess threaded portion of bolt 102 extends radially outward from diffuser 80. Wing 44 may meet mounting bracket 60 at a location central to fastener holes 100 (of FIG. 5B) to accommodate installation of bolts 102.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of mounting a turbine retention device, comprising:
   aligning a mounting bracket with an opening in a cylindrical diffuser, the mounting bracket attached to a monolithic wing;
   configuring at least one of the mounting bracket or the monolithic wing such that a proximal portion of the wing lies along an axial length of a bullet at a tangential angle to the bullet, wherein the tangential angle is such that the monolithic wing extends from a surface of the bullet and the monolithic wing lies on a non-radial plane with respect to a cylindrical geometry of the bullet; wherein the bullet comprises a solid cap to prevent flow through the bullet; and
   installing a fastener through the opening and the mounting bracket.

2. The method of claim 1, wherein the fastener comprises a bolt.

3. The method of claim 1, wherein the fastener comprises a rivet.

4. The method of claim 1, further comprising placing a spacer between the fastener and the cylindrical diffuser.

5. The method of claim 1, wherein the opening is formed in the cylindrical diffuser while the cylindrical diffuser is installed on an aircraft.

6. The method of claim 1, further comprising forming a plurality of openings equally spaced about the cylindrical diffuser.

7. The method of claim 6, wherein forming the plurality of openings further comprises:
   placing a drill fixture on the cylindrical diffuser; and
   drilling the plurality of openings through the drill fixture.

8. The method of claim 7, further comprising clocking the drill fixture to align the drill fixture.

9. A method of installing a turbine retention device in a radial turbine engine, comprising:
   aligning a mounting bracket of the turbine retention device with an opening formed in a diffuser, the mounting bracket coupled to a monolithic wing coupled to a bullet such that a proximal portion of the monolithic wing lies along an axial length of the bullet at a tangential angle to the bullet, wherein the tangential angle is such that the monolithic wing extends from a surface of the bullet and the monolithic wing lies on a non-radial plane with respect to a cylindrical geometry of the bullet; wherein the bullet comprises a solid cap to prevent flow through the bullet and;
   installing a fastener through the opening and the mounting bracket.

10. The method of claim 9, wherein the fastener comprises a bolt.

11. The method of claim 9, wherein the fastener comprises a rivet.

12. The method of claim 9, further comprising placing a spacer between the fastener and the diffuser.

13. The method of claim 9, further comprising forming the opening while the radial turbine engine is installed on an aircraft.

14. The method of claim 9, further comprising forming sets of openings equally spaced about the diffuser.

15. The method of claim 14, wherein the forming the sets of openings further comprises:
   placing a drill fixture on the diffuser; and
   drilling the sets of openings through the drill fixture.

16. The method of claim 15, further comprising clocking the drill fixture to align the drill fixture.

17. A turbine retention device mounted to a diffuser, comprising:
   a bullet;
   monolithic wings coupled to the bullet such that a proximal portion of the monolithic wings lies along an axial length of the bullet at a tangential angle to the bullet, wherein the tangential angle is such that the monolithic wing extends from a surface of the bullet and the monolithic wings lie on a non-radial plane with respect to a cylindrical geometry of the bullet; wherein the bullet comprises a solid cap to prevent flow through the bullet;
   mounting brackets coupled to the monolithic wings; and
   fasteners disposed through the mounting brackets and openings formed in the diffuser.

18. The turbine retention device of claim 17, wherein the fasteners comprise at least one of rivets or bolts.

19. The turbine retention device of claim 17, wherein the openings formed in the diffuser are formed in pairs.

* * * * *